United States Patent Office 3,444,152
Patented May 13, 1969

3,444,152
TWO-STAGE POLYMERISATION PROCESS FOR CHLOROPRENE
Francis Paul Gintz, Sutton, Surrey, and Richard John Strachan Matthews, Great Bookham, Surrey, England, and Godfrey Malcolm Peirce, Swansea, Glamorgan, Wales, assignors to The Distillers Company Limited, Edinburgh, Scotland, a British company
No Drawing. Filed June 29, 1965, Ser. No. 468,112
Claims priority, application Great Britain, Aug. 5, 1964, 31,755/64, Patent 1,035,387
Int. Cl. C08d 1/09, 1/36, 3/14
U.S. Cl. 260—92.3                                7 Claims

ABSTRACT OF THE DISCLOSURE

Polychloroprene having improved physical properties is produced in a two-stage process wherein the first stage involve polymerising chloroprene to give a latex of cross-linked polymer and then polymerising chloroprene in this latex system under noncross-linking conditions such that the final chloroprene polymer contains a minimum of 10% and an upper limit of 60% by weight of the cross-linked polymer.

---

The present invention relates to a process for making chloroprene polymers and the polymers thus made.

By the term chloroprene polymer is meant the polymer formed by polymerising 2-chloro-1,3-butadiene or 2-chloro-1,3-butadiene and a minor proportion of a copolymerisable monomer or monomers.

The process, according to the present invention, for making chloroprene polymers as defined comprises polymerising chloroprene to give latex of a cross-linked polymer and polymerising chloroprene in this latex under noncross-linking conditions brought about by the presence of sufficient chain transfer agent to give a final chloroprene polymer containing a minimum of 10% and an upper limit of 60% by weight of the cross-linked polymer.

By cross-linked polymer is meant throughout this specification a chloroprene polymer which does not form a true solution in benzene at a temperature of 20° C. as determined by light scattering The test is described by L. H. Peebles in J. Am. Chem. Soc., 1958, vol. 80, p. 5603.

Polymerisation processes which give latices of cross-linked polymers are known. For example, an aqueous emulsion of the monomer can be rapidly polymerised in the presence of relatively high concentrations of polymerisation initiator using relatively high temperatures, usually in the range 40° C. to 90° C. Preferably the monomer should be added continuously whilst polymerisation to a cross-linked polymer is taking place and the polymerisation initiator concentration is adjusted to give, by the time the first twenty precent of the monomer has been added, a ratio of polymer to monomer of at least 1.5 to 1 and a ratio of at least 4 to 1 at the end of the cross-linking polymerisation stage. It is preferred to maintain the concentration of polymerisation initiator by adding it continuously to the polymerisation.

Most suitably sufficient chloroprene should be polymerised in the latex of the cross-linked polymer under noncross-linking conditions brought about by the presence of a chain transfer agent to give a final chloroprene polymer containing from 30 to 50% by weight of the cross-linked polymer.

By the term chain transfer agent is meant throughout this specification a compound which when present during polymerisation reduces the molecular weight of the polymer formed without substantially reducing the polymerisation rate. Some examples of chain transfer agents are the alkyl mercaptans, the dialkylxanthogen disulphides, iodoform, benzyl iodide, and some heterocyclic disulphide compounds. The preferred alkyl mercaptans contain 4 to 20 carbon atoms for example the butyl, n-hexyl, n-dodecyl and tert-dodecyl mercaptans. An example of a dialkylxanthogen disulphide is di-isopropyl xanthogen disulphide and an example of a heterocyclic disulphide is dibenzothiazyl disulphide.

The amount of chain transfer agent present during the polymerisation of chloroprene in the cross-linked polymer latex must be sufficient to prevent the formation of further amounts of cross-linked polymer.

For example where an alkyl mercaptan such as n-dodecyl mercaptan is the chain transfer agent a suitable proportion by weight on chloroprene monomer is in the range 0.1 to 1.0 precent.

It is preferred to carry out the polymerisation at temperatures in the range 0 to 75° C. and to stop the reaction before all the monomer is converted to polymer, preferably when about 70% by weight of the monomer has been polymerised.

It is preferred to make final chloroprene polymers according to the present invention having a Mooney viscosity (ML. 4' at 100° C.) of between 35 and 65 points. This can be achieved by selecting the proportion of cross-linked polymer present in the final polymer and adjusting the amount of chain transfer agent and the percentage conversion of chloroprene in the noncross-linking polymerisation reaction Many of the chloroprene polymers prepared by the process according to the present invention when compounded in the unvulcanised state have good processing characteristics as determined by mastication in a Brabender Plastograph. In particular, chloroprene polymers prepared by the preferred process have these good processing characteristics. The rate of extrusion of the compounded rubber is good and the surface finish of the extrudate is excellent. These polymers are superior in these characteristics to known chloroprene polymers prepared by bending cross-linked polymer latices with non-cross-linked polymer latices.

The present invention is further illustrated by the following examples.

EXAMPLE

A cross-linked chloroprene polymer latex was prepared using the following ingredients:

| | Parts by weight |
|---|---|
| Chloroprene | 30 |
| Distilled water | 130 |
| Sodium hydroxide | 0.4 |
| "Dresinate 214" (a registered trademark for a composition containing a potassium salt of disproportionated rosin) | 4.0 |
| "Daxad 15" (a registered trademark for a composition containing di-sodium salt of condensation product of formaldehyde and naphthalene sulphonic acid) | 0.7 |
| Ammonium persulphate | [1] 0.026 |

[1] At start and then 0.013 per hr.

The water, sodium hydroxide, Dresinate 214 and Daxad 15 were heated at 70° C. in a polymerisation reactor and stirred under a blanket of nitrogen. The chloroprene and the ammonium persulphate were then added continuously over a period of one hour; the latter was added as a 0.8% solution in a 2.5% solution of sodium hydroxide. The polymerisation was continued until 95% of the monomer had polymerised to form a latex of a cross linked polymer. The reaction temperature was then lowered from 70° C. to 45° C. and 0.027 part of sodium dithionite were added. A further 70 parts by weight of chloroprene together with 0.435 part by weight n-dodecyl mercaptan were then added to this latex. The mixture was stirred for one hour at 45° C. Ammonium persulphate was then added at the rate of 0.0015 part per hour as a 3.6% aqueous solution. The reaction was continued until 70% of the added monomer had been polymerised. A test polymerisation carried out in the absence of cross-linked polymer showed that polychloroprene formed under these conditions was not cross-linked. The polymerisation was then short-stopped by the addition of 15.5 parts by weight of an emulsion containing 0.02 part of tertiary butyl catechol and 0.02 part of phenothiazine. The residual monomer was stripped off, the pH of the latex was reduced to 6 with 10% acetic acid, and the rubber was isolated by freeze coagulation. The rubber had a Mooney viscosity of 43 and contained 38 percent of cross-linked polymer. This rubber was designated as rubber A.

By way of comparison a chloroprene rubber composition containing 40 percent of a cross-linked chloroprene polymer and designated as rubber B was prepared by blending a latex containing 40 parts of cross-linked chloroprene polymer with a latex containing 60 parts of a noncross-linked chloroprene polymer. The cross-linked polymer latex was prepared by a continuous monomer addition technique essentially similar to that previously described for the preparation of rubber A. The noncross-linked polymer latex was made by a standard batch polymerisation technique in which all the components except the persulphate were charged together in the reactor before initiating the polymerisation.

The ingredients used in the preparation of the cross-linked and noncross-linked polymers are given in the following table.

| Ingredients | Parts by weight | |
|---|---|---|
| | For cross-linked polymer latex | For non-cross-linked polymer latex |
| Chloropene | 100 | 100 |
| Distilled water | 130 | 130 |
| "Dresinate 214" (a reg. trademark) | 4 | 4 |
| Sodium hydroxide | 0.4 | 0.1 |
| Daxad 15 (a reg. trademark) | 0.7 | 0.7 |
| Ammonium persulphate | (1) | (2) |
| Sodium dithionite | Nil | 0.27 |
| n-Dodecyl mercaptan | Nil | 0.32 |

1 0.013 part by weight/hour.
2 0.0015 part by weight/hour at start and then 0.027 per hour.

Rubber B had a Mooney viscosity of 40. Rubber A and Rubber B both showed good processing characteristics as determined by masticating 100 parts of each rubber in a Brabender Plastograph at 60° C. for 5 minutes. 30 parts of G.P.F. carbon black were added and the mastication continued. In both cases smooth nonjerky traces were obtained which are characteristic of polymers having low nerve.

Both rubbers were compounded using the following formulation:

| | Parts by weight |
|---|---|
| Polychloroprene | 100 |
| Phenyl beta naphthylamine | 2.0 |
| Stearic acid | 0.5 |
| Light calcined magnesia | 4.0 |
| G.P.F. carbon black | 29.0 |
| Zinc oxide | 5.0 |
| Robac 22 [1] | 0.5 |

[1] Robac 22 is a registered trademark for a brand of ethylene thio urea.

These unvulcanised compounds were extruded using a Brabender Plastograph equipped with an extruder head. The speed of rotation of the screw was 60 r.p.m. and the die temperature was 75° C. A right-angled triangular die with sides of 3 mm. and 5 mm. making an angle of 90° was used. The extrudates were examined with particular reference to the feather edge formed at the acute angle of the triangular die.

Compounded rubber A extruded at a rate of 15.1 ccs./minute. It gave a smooth feather edge and a glossy smooth surface. Compounded rubber B extruded at a rate of 16.4 ccs./minute and gave an inferior rougher edge and a much less smooth surface.

Vulcanised compound A had a tensile strength of 2125 p.s.i. while compound B gave a tensile strength of 1790 p.s.i.

We claim:
1. A process for making a chloroprene polymer by polymerising 2-chloro-1,3-butadiene and including polymers formed by polymerising 2-chloro-1,3-butadient and a minor proportion of a copolymerisable monomer, said process comprising polymerising chloroprene to give a latex of a cross-linked polymer which does not form a true solution in benzene at a temperature of 20° C. as determined by light-scattering and polymersing chloroprene in this latex under noncross-linking conditions, brought about by the presence of sufficient chain transfer agent, to give a final chloroprene polymer containing a minimum of 10% and an upper limit of 60% by weight of the cross-linked polymer.

2. A process as claimed in claim 1 wherein the chloroprene monomer is added continuously whilst polymerisation to the cross-linked polymer is taking place and the polymerisation initiator concentration is adjusted to give by the time the first 20% of monomer has been added a ratio of polymer to monomer of at least 1.5 to 1 and a ratio of at least 4 to 1 at the end of the cross-linking polymerisation stage.

3. A process as claimed in claim 1 wherein the polymerisation of chloroprene to give the latex of cross-linked polymer is carried out in aqueous emulsion at a temperature in the range 40 to 90° C.

4. A process as claimed in claim 1 wherein the chain transfer agent is an alkyl mercaptan.

5. A process as claimed in claim 1 wherein the chain transfer agent is an alkyl mercaptan present in a proportion by weight on chloroprene monomer in the range 0.1 to 1.0%.

6. A process as claimed in claim 1 wherein the chain transfer agent is n-dodecyl mercaptan.

8. A process as claimed in claim 1 wherein the final chloroprene polymer contains a minimum of 30% and an upper limit of 50% by weight of the cross-linked polymer.

References Cited

UNITED STATES PATENTS 2,763,635   9/1956   Tucker et al. _____ 260—92.3
3,147,317   9/1964   Jungk et al. _____ 260—890

JAMES A. SEIDLECK, *Primary Examiner.*

W. F. HAMROCK, *Assistant Examiner.*

U.S. Cl. X.R.

260—29.7, 23.7, 41.5, 96, 890